Sept. 17, 1940.     P. H. CRAIG     2,214,879
GENERATOR REGULATOR
Filed April 2, 1936     3 Sheets-Sheet 1
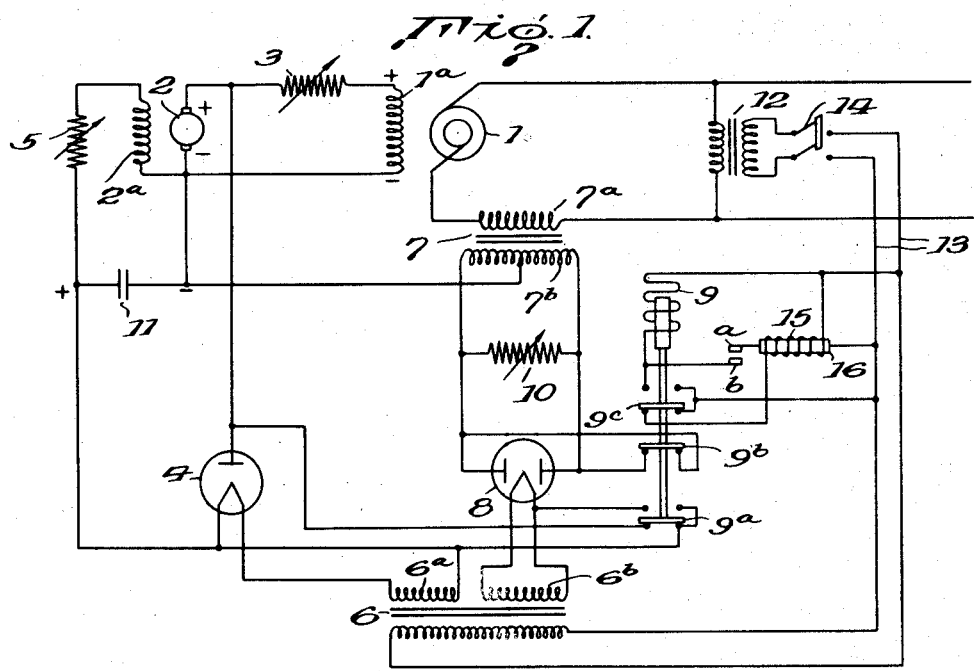
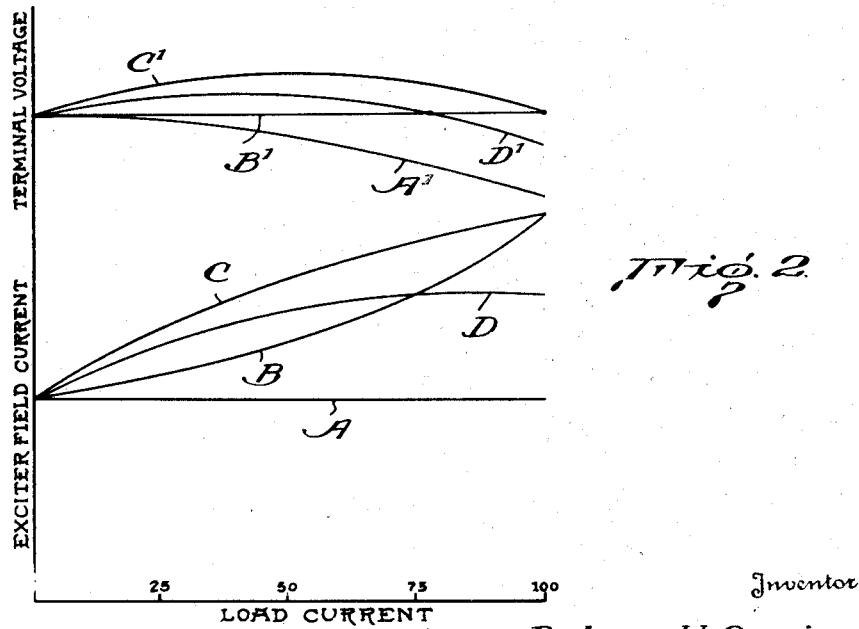
Inventor
Palmer H. Craig,
By Ralph B. Stewart
Attorney Sept. 17, 1940.   P. H. CRAIG   2,214,879
GENERATOR REGULATOR
Filed April 2, 1936   3 Sheets-Sheet 2

Inventor
Palmer H. Craig,

By Ralph O. Stewart
Attorney

Sept. 17, 1940.  P. H. CRAIG  2,214,879
GENERATOR REGULATOR
Filed April 2, 1936  3 Sheets-Sheet 3
Fig. 4
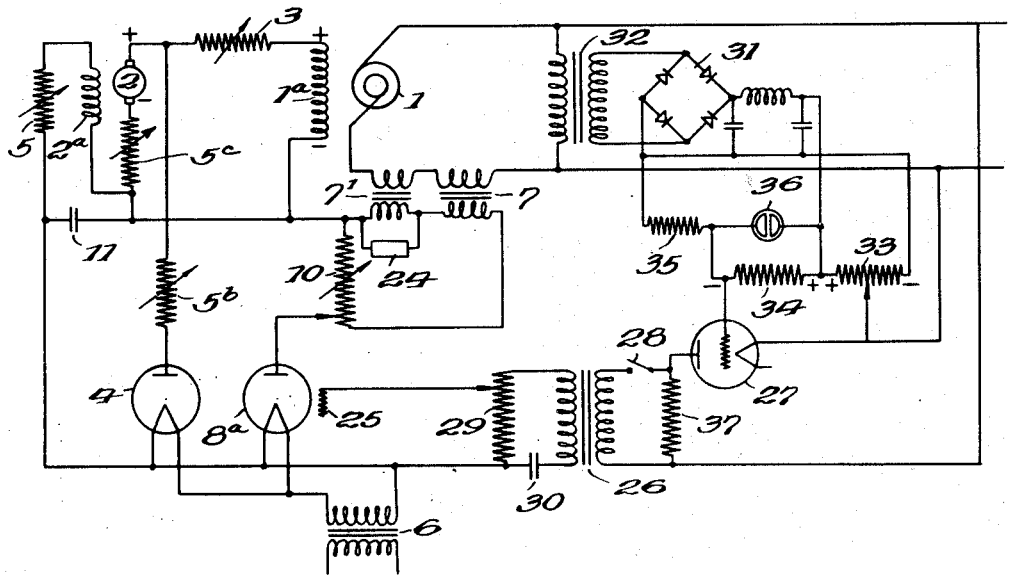
Fig. 4ª
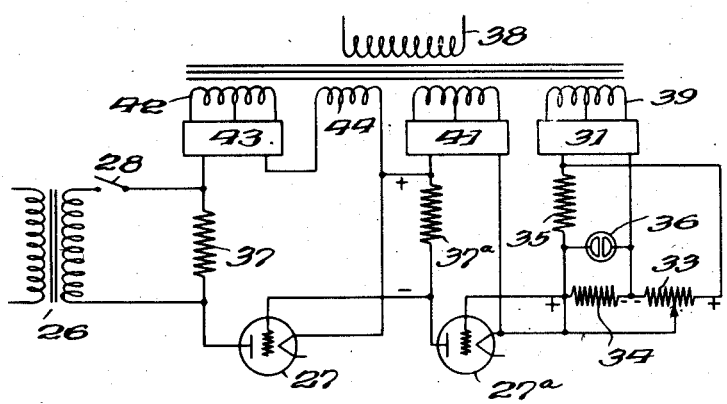
Inventor
Palmer H. Craig,
By Ralph B. Stewart
Attorney Patented Sept. 17, 1940

2,214,879

UNITED STATES PATENT OFFICE 2,214,879

GENERATOR REGULATOR

Palmer Hunt Craig, Bethlehem, Pa., assignor to Invex Corporation, Cleveland, Ohio, a corporation of New York Application April 2, 1936, Serial No. 72,427

15 Claims. (Cl. 171—119)

The present invention relates to arrangements for regulating the voltage of a generator, and in particular to arrangements for the automatic regulation of an alternating current generator.

An object of my invention is to devise a novel regulating means for increasing the generated voltage in an alternator in response to an increase in the load on the alternator.

A further object is to devise a regulating circuit for an alternator which is devoid of vibrating regulating contacts.

Further and more specific objects will appear from the description of the invention which follows.

My invention is illustrated in the accompanying drawings in which:

Figure 1 is a schematic circuit diagram illustrating one form of regulator according to my invention;

Figure 2 is a graph showing a series of curves for explaining the operation of the regulator;

Figure 4 is a schematic circuit diagram illustrating possible variations of my invention; and Figure 4a is a circuit diagram showing a modification of the arrangement of Figure 4.

Figure 3:
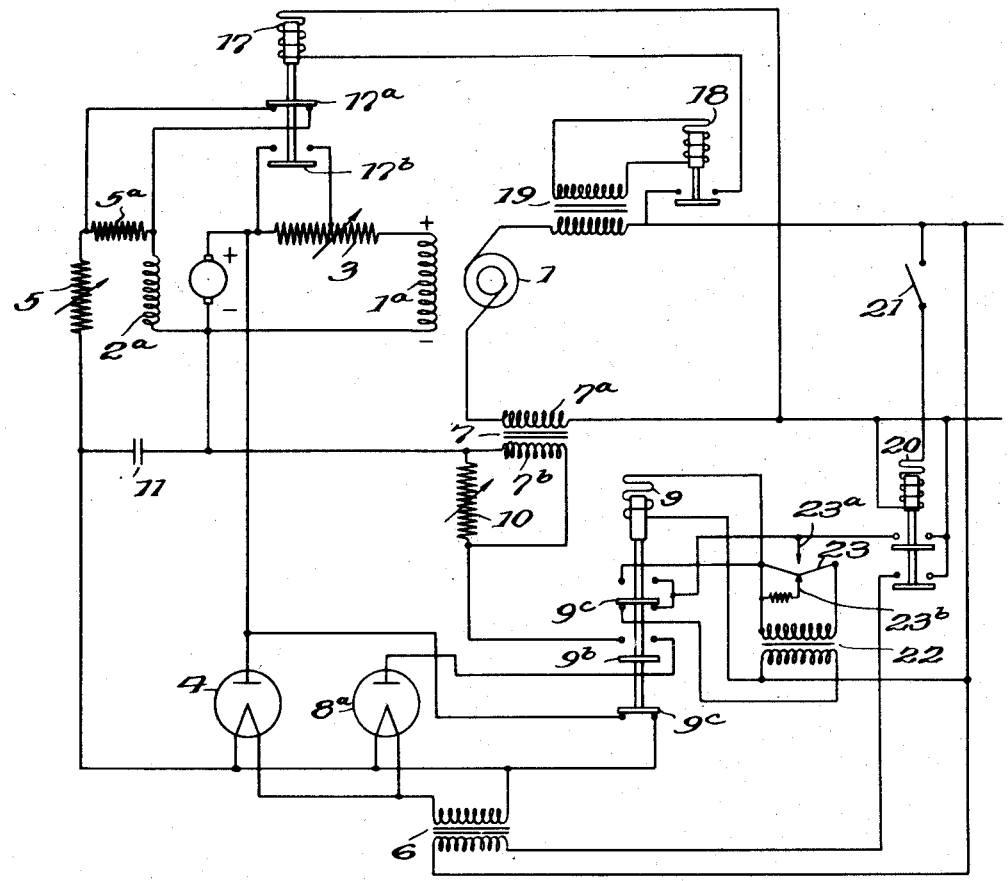
Figure 3 is a schematic circuit diagram illustrating a second form of regulator according to my invention.

Referring to the drawings, the armature of an alternator to be regulated is indicated at 1 and the field winding of the alternator is shown at 1a. Exciting current is supplied to the field 1a from the armature 2 of an exciter generator through an adjustable resistance 3. The field 2a of the exciter is supplied with current from the armature 2 through a circuit which extends from the positive terminal of the armature 2, through a two-element thermionic valve 4, through a variable resistance 5, field coil 2a and back to the negative terminal of the armature 2. The filament or cathode of the tube 4 is energized from secondary winding 6a of transformer 6 which is connected to a suitable source of alternating current voltage. A transformer 7 has its primary winding 7a connected in series with the load circuit of the alternator, and the outer terminals of the secondary winding 7b are connected to the plate elements of a full-wave rectifier tube 8. The mid-point of the secondary winding 7b is connected to the terminal of the exciter field coil 2a which is connected to the negative terminal of the exciter armature 2, and suitable connections are provided from the filament of the rectifier tube 8 to the other terminal of the exciter field winding 2a, including the upper contacts associated with armature 9a on a protective switch 9, and the adjustable field resistance 5. The filament or cathode of the rectifier 8 is energized from the secondary winding 6b of the transformer 6. An adjustable resistance 10 is connected in shunt to the secondary winding 7b of the transformer 7 for the purpose to be described later, and condenser 11 is connected in parallel with the exciter field coil 2a and the adjustable field resistance 5.

The winding of the protective switch 9 is energized from the same source of current that energizes transformer 6, and while this source may be a separate source of current, I prefer to energize these elements from the output circuit of the alternator, for example, by means of a transformer 12 connected to the alternator circuit and having a secondary winding supplying current to conductors 13 through a switch 14. The circuit for energizing the switch 9 is controlled by a time delay relay having a winding 15 connected across conductors 13 through the lower contacts associated with armatures 9c on the switch 9. Arranged within the winding 15 is a heat responsive core 16 having one fixed end connected to one of the conductors 13 and carrying at its free end the contact (a). The member 16 may be formed of a by-metallic strip which when heated by a current flowing through winding 15 curves in a direction to engage the contact (a) with the contact (b) and thereby complete a circuit through the winding of switch 9. The core 16 possesses appreciable thermal lag and there will be an appreciable time lag between the time of energization of the winding 15 and the time of closing contacts (a) and (b). The upper contacts associated with armature 9c serve to complete an energizing circuit through the winding of relay 9 independently of the contacts (a) and (b) upon operation of switch 9. The contacts associated with the armature 9b of switch 9 serve to short-circuit the anode elements of the tube 8 when the switch 9 is deenergized, and the lower contacts associated with armature 9a serve to short-circuit the filament and plate of the valve 4 when the switch 9 is deenergized. The output circuit of rectifier 8 is open-circuited at the upper contacts of armature 9a when switch 9 is deenergized.

Operation of the arrangement shown in Figure 1 is as follows: So long as the switch 14 is open, the circuit connections are as indicated in Figure 1, and it will be seen that the valve 4 is short-circuited by the armature 9a and the secondary winding of the current transformer 7 is short-circuited by armature 9b. Under these conditions, the regulating circuit is inoperative, and the alternator will operate as an unregulated generator, the field current for the exciter 2 being supplied entirely from the exciter armature. Upon closing the switch 14, the winding 15 of the time delay switch is energized through armature 9c, and the cathodes of tubes 4 and 8 are also energized through the transformer 6. The switch 9 remains in the position shown in Figure 1 until the time delay switch closes contact (a)—(b), and there is sufficient delay in the closing of these contacts to permit the cathodes of tubes 4 and 8 to attain the proper operating temperatures before the circuit of switch 9 is closed, thus delaying the application of plate potential to the tubes until the cathodes reach proper operating condition. As soon as the switch 9 operates, the short-circuit across the elements of tube 4 is removed, and armature 9a connects the cathode of the tube 8 to one side of the exciter field winding 2a through the adjustable resistance 5. Also, the short-circuit across the secondary of transformer 7 is removed, and, under these conditions, it will be seen that the current transformer 7, in cooperation with the rectifier 8, supplies direct current to the exciter field winding 2a in parallel with the exciter armature 2. Valve 4 is connected in proper direction to permit current to flow from armature 2 through the exciter field 2a, but it prevents current from flowing from the rectifier 8 through armature 2 or through the alternator field 1a. At no-load condition, the entire current flowing through exciter field 2a is supplied from the armature 2, but as the alternator begins to supply current to its load, additional field current is supplied to winding 2a by the rectifier 8. As the load supplied by the alternator armature increases, the amount of additional field current supplied to the exciter field winding increases, and the increased exciter field current causes a greater exciting current to be supplied to the field winding of the alternator, and this in turn increases the generated voltage of the alternator to compensate for the increased drop within the alternator and in the lines at higher load current values. It will be noted that the current supplied to the exciter field coil 2a is in the same direction as the current supplied to the coil by armature 2. The polarity of the rectifier is indicated by proper signs on opposite sides of condenser 11.

The operation of the regulator system may be better understood by reference to the graph shown in Figure 2. The curves shown in Figure 2 are not plotted from actual data, and are not intended to be drawn to scale, but the general shapes of the curves will indicate the general character of operation of the circuit. The lower group of curves in Figure 2 show the variation in exciter field current with load current under certain conditions, while the upper group of curves show the variation in the terminal voltage of the alternator with increasing load current under the same conditions as for the lower group of curves. Curve A represents the exciter field current when the switch 14 is open and the regulator is inoperative. Under this condition, the exciter field current remains constant regardless of any load current variations, and the terminal voltage of the alternator decreases as the load current increases, as indicated by curve A'.

Curve B represents the exciter field current which is required to maintain a constant voltage at the terminals of the alternator as the load current increases. The alternator terminal voltage curve under such condition is represented by the curve B'.

Curve C represents the total exciter field current supplied jointly from the exciter armature 2 and from rectifier 8 when the regulator is operative, as the load current increases in value. As will be seen from Figure 2 this curve does not coincide with curve B, but it meets curve B at full load current condition and at this point the exciter field current is of proper value to produce the same terminal voltage of the alternator as for no-load condition. For load current values less than full load condition, the exciter field current is greater than that necessary to maintain constant voltage, and the circuit is overcompensated over this range, as will be seen from the curve C'.

By adjusting the value of resistance 10, the slope of the curve representing the energizing exciter field current can be varied from that shown by the curve C in Figure 2, and the curve D illustrates a condition of adjustment where the slope has been reduced below that of curve C, and under this condition the curve D crosses the curve B at approximately 75% full load current. Below this point the circuit is overcompensated, and above this point, it is undercompensated. The terminal voltage curve corresponding to curve D is represented by curve D'. It will be understood that the rectifier circuit including elements 7, 8, 10 and 11 may also be designed and adjusted to increase the slope of the exciter field current curve above that shown in curve C so the generator will be over-compensated throughout the entire range, and this condition is useful where it is desired to compensate for voltage drop in the line up to a desired load center.

In Figure 3 I have shown the circuit diagram of a modified generator regulator. The general arrangement of this regulator is the same as the regulator illustrated in Fig. 1, and corresponding elements in the two systems are indicated by corresponding reference numerals. The main differences between the circuit of Figure 3 and the circuit of Figure 1 are: (1) A half-wave rectifier tube 8a is employed instead of a full wave rectifier, although a full wave rectifier may be used, if desired. (2) A relay 17 is provided with an armature 17a which short-circuits a portion of the exciter field resistance 5a when the relay is deenergized, and a second armature 17b arranged to short-circuit a portion of the generator field resistance 3 when the relay is energized. This relay is controlled by a current responsive relay 18 energized from a series transformer 19 connected in series with the alternator load circuit. (3) A relay 20 connected across the alternator circuit by means of a switch 21 controls the circuits for energizing protective relay 9 and filament transformer 6. (4) The time delay relay for controlling the circuit to protective relay 9 is of different construction from that shown in Figure 1 and consists of a transformer 22 having a thermally responsive element 23 connected across its secondary and is adapted to be heated by current from the secondary winding. It will be understood that the details of the time delay relay are not important, and any desired construction may be employed.

The operation of the arrangement shown in Figure 3 is as follows: So long as the switch 21 is open, or so long as the voltage of the alternator is below a value sufficient to operate relay 20, relay 9 is deenergized and valve 4 is short-circuited through armature 9c, while the circuit through rectifier 8a is open circuited at armature 9b. So long as the generator does not deliver substantial current to the line, relay 17 remains deenergized and part of the exciter field resistance 5a is short-circuited. Under the conditions stated above and as shown in Figure 3, the alternator will operate as an unregulated generator. As soon as the voltage of the alternator increases to a value sufficient to operate relay 20, this relay operates and closes the energizing circuits for filament transformer 6 and the time delay relay controlling switch 9. The lower armature of relay 20 closes the circuit to transformer 6. The circuit through the time delay relay extends from one side of the alternator circuit through the upper armature on relay 20, through armature 9c on switch 9, through the primary winding of transformer 22 and back to the other side of the alternator circuit. Current induced in the secondary of transformer 22 flows through the thermally responsive element 23 to heat the same, and, after a predetermined period, the element 23 snaps from the position shown into engagement with the upper contact 23a, and this completes a circuit through the winding of switch 9 extending from one side of the alternator circuit through the upper armature of switch 20, contact 23a, element 23, winding 9, and back to the other side of the alternator circuit. The switch 9 now operates, and the armature 9c completes a circuit for maintaining the switch winding energized independently of the time delay relay; armature 9b closes the circuit leading from the secondary winding of the current transformer 7 to the plate of the rectifier 8a, and armature 9c removes the short-circuit from around valve 4. As the load upon the alternator increases from zero towards full load condition, the operation of the regulator is the same as the arrangement shown in Figure 1.

In order to prevent the voltage of the exciter from rising too high in the upper range of load currents, I adjust the relay 18 so that it operates at load current values of one-half full load or greater, and the operation of this relay closes the circuit of relay 17 which short-circuits a portion of the generator field resistance 3 and inserts an additional resistance 5a in the circuit of the exciter field. By this arrangement, the necessary range of voltage variation of the exciter is reduced. It is obvious that the relay 17 might be operated directly from current transformer 19 and relay 18 may be omitted. In operating the circuit of Figure 3, the switch 21 may remain in closed position during starting, since the relay 20 will not pick up before the alternator voltage has reached a definite value.

In Figure 4 I have shown a circuit diagram illustrating several possible variations in the regulator arrangement. Here also the general circuit arrangement is the same as shown in Figures 1 and 3, and corresponding parts are indicated by corresponding reference numerals.

In the arrangement illustrated in Figure 4, the protective relay circuits have been omitted, since these circuits, while desirable, are not essential. In Figure 4 I have also shown three different positions for the variable resistance which controls the exciter field current supplied from the exciter armature. The preferred position for this resistance is shown at 5, but it may be inserted at the position indicated at 5b, between the exciter armature 2 and the valve 4, or it may be inserted at 5c where it controls not only the exciter field current but also the field current supplied to the alternator.

In order to obtain a closer agreement between the curve C and the curve B in Figure 2, I may use two current transformers 7 and 7' connected in series, as shown in Figure 4, with the secondary windings of these transformers connected in opposed relation. Also, one of the transformers, for example, 7', is of smaller capacity than the other transformer and is designed to become saturated at relatively low values of load current while the other transformer does not become saturated even at full load current. With this arrangement, the voltage of transformer 7' may buck-out any desired percentage of the voltage of transformer 7 at low values of load current, but as the load current increases in value, and the transformer 7' becomes saturated, the voltage of transformer 7 will increasingly predominate over the voltage of transformer 7' and will produce a curve C which more closely approximates the curve B. In order to obtain a still closer approximation to the ideal curve, I may connect in shunt to the secondary winding of transformer 7' a resistance element 24 having a negative resistance characteristic such that its resistance decreases as the current flowing therein increases. With such an arrangement, at low load current values, the resistance of element 24 is high and the full voltage of the transformer 7' is effective in opposing the voltage of transformer 7, but as the load current increases, the resistance of the element 24 drops and reduces the terminal voltage below the value which it would assume if the resistance element were not present. Resistance element 24 may be formed of a gaseous conduction tube, such as a mercury vapor tube, or of resistance material commonly known as "Thyrite," or both a mercury vapor tube and a Thyrite resistance element may be connected in series across the secondary winding of transformer 7'.

As illustrated in Figure 4, I may also provide a grid control element 25 for the rectifier tube 8a, and this grid control element may be supplied with a biasing potential which varies in accordance with the voltage variation in the alternator load circuit. For this purpose I may use a transformer 26 which is connected to the alternator circuit through a relay or amplifier tube 2 and the switch 28. A potentiometer 29 and a condenser 30 are connected in series across the secondary winding of transformer 26, and the grid 25 is connected to the variable contact of potentiometer 29. The values of resistance 29 and condenser 30 are so chosen that the potential applied between the cathode and the grid 25 has a lagging phase relation with respect to the potential applied between the cathode and the anode of the rectifier 8a, and the preferred amount of lag is of the order of 135 degrees. This condition of adjustment renders operation of the rectifier 8a dependent upon the value of the potential applied to the grid 25 so that the greater the potential applied to the grid 25, the smaller will be the plate current flowing through the rectifier tube, and vice versa, all as more fully explained in my U. S. Patent 2,001,836.

For best operation it is desirable that the voltage changes supplied to the transformer 26 be amplified above the percentage change of the alternator voltage. For this purpose I provide an arrangement for impressing a variable biasing potential upon the grid of the amplifier tube 27. This biasing arrangement consists of a rectifier 31 supplied from the alternator circuit through a transformer 32, and this rectifier supplies current to a biasing resistance element 33. The cathode of the tube 27 is connected to a variable contact on resistance 33. A circuit is also provided for supplying current to a biasing resistance 34 from the rectifier 31 through a ballast resistance 35, and a gaseous discharge tube 36 (such as neon lamp) is connected across the terminals of resistance 34 to maintain the potential drop across this resistance substantially constant and independent of voltage variations of the alternator. The polarities of the potential drops across resistances 33 and 34 are as indicated in the drawings (in opposing relation), and the magnitude of these drops are so adjusted that for a decrease in alternator potential below normal, the biasing potential applied to the grid of tube 27 is increasingly negative or is less positive, and upon increase in alternator voltage above normal, the biasing potential becomes less negative or more positive. It will thus be seen that voltage changes impressed upon the transformer 26 will be accentuated over the changes in the alternator voltage. It will be understood that the voltage drop across resistance 33 varies in accordance with the alternator voltage variation, whereas the voltage drop across resistance 34 is substantially constant. A resistance element 37 is connected in parallel with the primary of the transformer 26, and the value of this element is adjusted so as to cause most of the plate current of tube 27 to flow through this resistance. This arrangement prevents any substantial change in phase relation of the current supplied to the transformer 26 as the resistance of tube 27 is varied.

So long as the switch 28 controlling the grid circuit is open, the operation of the regulator of Figure 4 is as described above for Figures 1 and 3. Upon closing the switch 28, the operation of the rectifier 8a is subject to control according to the voltage existing across the alternator circuit. Should the voltage across the alternator circuit increase in value, the increased potential applied to the grid 25 causes less current to flow through the rectifier 8a and, therefore, reduces the amount of current flowing through the exciter field winding 2a. Similarly should the voltage of the alternator circuit decrease below normal, the voltage applied to the grid 25 permits a larger current to flow in the rectifier 8a and to thereby increase the excitation of the exciter. It will, therefore, be seen that with the grid control circuit of Figure 4 operating, the regulator shown in this circuit compensates both for voltage drop due to load variations and for variations in voltage of the alternator circuit.

In Figure 4a I have shown a modified arrangement for supplying biasing voltage to the grid of rectifier 8a in Figure 4. In this arrangement a transformer is provided with a primary winding 38 which is connected across the alternator load circuit, and a secondary winding 39 is connected with the rectifier 31 which supplies direct current to the balancing arrangement previously described and including the elements 33, 34, 35 and 36. A secondary winding 40 is connected to supply direct current to the plate circuit of a voltage amplifier tube 27a through a rectifier 41, and the output circuit of amplifier 27a is connected to the input circuit of amplifier 27 through a coupling resistance 37a. A third secondary winding 42 supplies direct current to the plate circuit of amplifier 27 through rectifier 43, and a fourth secondary winding 44 is connected in series with the plate circuit of tube 27 for supplying an alternating current component to the plate circuit. The output circuit of amplifier 27 is connected to the grid transformer 26 in the same manner as in Figure 4. The main difference between the arrangement of Figure 4a and that shown in Figure 4 is the insertion of the voltage amplifier 27a between the voltage balance and the amplifier 27. The presence of this amplifier makes it necessary to reverse the polarities of the resistance elements 33 and 34 as shown in the drawings and the amplitudes of the voltage drops across these resistance elements is adjusted so that normally the drop across resistance 33 is larger than the drop across element 34 and a negative bias is applied to tube 27a. Upon a drop in the line voltage below normal value, the bias voltage applied to tube 27a becomes less negative, thereby increasing the plate current and applying a more negative bias to tube 27, which in turn reduces the plate current flow through tube 27 and, therefore, reduces the potential applied to the grid 25 of rectifier 8a. An increase in line voltage above normal operates in reverse order to increase the potential applied to the grid 25 of the rectifier 8a and thereby reduce the excitation supplied to the exciter field circuit. A voltage stabilizer or regulator of well known construction may be inserted between primary winding 38 and the load circuit, if desired, but in this case a separate transformer must be used to supply the rectifier 31 directly from the line.

In all of the arrangements described herein, the exciting current flowing through coil 2a is supplied from two sources connected in parallel, that is, from the exciter armature 2 from the line current rectifier 8 or 8a. The uni-directional conductive elements 4 and 8 prevent the interchange of current between these two sources. It is obvious that instead of supplying part of the exciting current from the armature 2, a separate source of current may be provided if desired.

In both Figures 1 and 3 the protective relay 9 is arranged to normally short-circuit the valve 4 and to open circuit the rectifier 8 or 8a. In starting up the alternator, the regulator circuits are inoperative and the exciting circuits are according to standard practice for an unregulated alternator. Since the relay 9 is energized from the alternator circuit, the regulator circuits do not become effective until a predetermined voltage has been established across the alternator circuit, and, conversely, the regulator circuit is automatically disabled upon the failure of voltage across the alternator circuit.

In any of the circuit arrangements disclosed herein in which a two-element thermionic valve is used as a rectifier or as a uni-directional conductive element, the tube may be replaced by well known rectifier units of the solid-element type. It is also apparent that greater flexibility of adjustment may be obtained by connecting the rectifier tube 8 or 8a to a variable contact on a resistance 10 as shown in Figure 4. While I have shown the regulating rectifier 8 or 8a connected to supply current to the field coil of the exciter, it is obvious that the rectifier could be connected in parallel with the generator field coil 1a, in which case the valve 4 would be inserted between the armature 2 and the variable resistance 3 in order to prevent the rectifier 8 from supplying current through the exciter armature 2. In such an arrangement, the exciter field would be connected in shunt to the armature 2 in the usual manner.

Various other modifications falling within the scope of my invention will be obvious to those skilled in the art.

What I claim is:

1. In combination, an alternator having a load circuit, means for exciting said alternator including an exciting coil, means including a uni-directional conductive device for supplying direct current to said exciting coil variable in accordance with the load current flowing in the load circuit of said alternator, a separate source of direct current, and circuit connections from said separate source including a uni-directional conductive device for normally supplying a substantial portion of the exciting current to said exciting coil in the same direction as said first means and in parallel therewith.

2. In combination, an alternator having a load circuit, means for exciting said alternator including an exciting coil, a transformer connected in series with said load circuit, a rectifier connected to a secondary winding of said transformer and connected to supply direct current to said exciting coil, a separate source of direct current, and circuit connections from said separate source including a uni-directional conductive device for normally supplying a substantial portion of the exciting current to said exciting coil in the same direction as said rectifier and in parallel therewith.

3. In combination, a generator having load circuit, means for exciting said generator including an exciting coil, means for supplying exciting current to said coil to fix the no-load voltage of said generator, means connected in parallel with said coil for supplying additional exciting current variable in accordance with the current flowing in the load circuit of said generator, and a uni-directional conductive device included in series with each current supply circuit for preventing the interchange of current between said sources.

4. In combination, an alternator having a field winding and a load circuit, an exciter generator for supplying exciting current to said field winding and having an exciting winding, circuit connections for supplying current to said exciting winding from the armature of said exciter, a current transformer connected in the load circuit of said alternator, a rectifier connected to the secondary of said transformer, connections from said rectifier to supply current to said exciting winding in parallel with said exciter armature, and a uni-directional conductive device connected in series with said exciter armature for preventing current from said rectifier from flowing through said exciter armature.

5. In combination, a generator having a field winding and a load circuit, an exciter generator for supplying exciting current to said field winding and having an exciting winding, means for supplying current to said exciting winding variable in accordance with the current flowing in the load circuit of said generator, and means responsive to a predetermined current flowing in said load circuit for simultaneously increasing the resistance of the exciter field circuit and decreasing the resistance of the exciter armature circuit.

6. In combination, an alternator having a field winding and a load circuit, an exciter generator for supplying exciting current to said field winding and having an exciting circuit, and means responsive to a predetermined current flowing in the load circuit for simultaneously increasing the resistance of the exciting circuit of said exciter generator and decreasing the resistance of the exciting circuit for said alternator.

7. In a regulator, the combination of a generator field coil, two sources of voltage for supplying current to said coil in parallel, a thermionic valve connected between one source and said coil to prevent current from the other source from flowing therethrough, a circuit for energizing the cathode of said valve, means for normally short-circuiting said valve, and time delay means responsive to the energization of said cathode circuit for removing the short-circuit from said valve.

8. In combination, an alternator having a load circuit, means for exciting said alternator including an exciting coil, an energizing circuit for said coil including a uni-directional conductive device, means for normally short-circuiting said device, and means responsive to a predetermined voltage in said load circuit for removing said short-circuit.

9. In combination, an alternator having a load circuit, means for exciting said alternator including an exciting coil, an energizing circuit for said coil including a thermionic valve having a cathode energized from said load circuit, and means responsive to failure of voltage in said load circuit for short-circuiting said valve.

10. In combination, an alternator having a load circuit, means for exciting said alternator including an exciting coil, a rectifier for supplying direct current to said coil from said load circuit, means for normally maintaining the circuit of said rectifier open, an energizing circuit for supplying exciting current to said coil independently of said rectifier including a uni-directional conductive device, means for normally short-circuiting said device, and means responsive to a predetermined voltage in said load circuit for removing the short-circuit on said device and for closing the rectifier circuit.

11. In combination, an alternator having a load circuit, means for exciting said alternator including an exciting coil, means for normally supplying a magnetizing current to said exciting coil to fix the no-load voltage of said alternator, a transformer connected in series with said load circuit, a rectifier connected to a secondary winding of said transformer for supplying additional direct current to said coil in the same direction as the normal magnetizing current but variable in accordance with the current in said load circuit, and means for varying the resistance of the rectifier circuit in accordance with variations in voltage of said load circuit.

12. In combination, an alternator having a load circuit, means for exciting said alternator including an exciting coil, means for normally supplying a magnetizing current to said exciting coil to fix the no-load voltage of said alternator, a transformer connected in series with said load circuit, a rectifier connected to a secondary winding of said transformer for supplying additional direct current to said coil in the same direction as the normal magnetizing current but variable in accordance with the current in said load circuit, said rectifier comprising a thermionic valve provided with a control electrode, and an energizing circuit for said control electrode connected across said load circuit for varying the resistance of said valve in accordance with variations in voltage of said load circuit.

13. In combination, an alternator having a load circuit, means for exciting said alternator including an exciting coil, a pair of transformers having their primary windings connected in series with the alternator load circuit, one of said transformers being of smaller capacity than the other and being adapted to become saturated in the lower range of load current values, a secondary circuit including in serial circuit relation, a secondary winding on each of said transformers, a rectifier unit and said exciting coil, whereby direct current is supplied to said coil from said transformers, the secondary winding on the smaller transformer being connected in opposition to the secondary winding on the larger transformer and having a voltage not greater than the voltage of the larger transformer at load current values below the point of saturation.

14. In combination, an alternator having a load circuit, means for exciting said alternator including an exciting coil, a pair of transformers having their primary windings connected in series with the alternator load circuit, a secondary circuit including in serial circuit relation a secondary winding on each of said transformers, a rectifier unit and said exciting coil, whereby direct current is supplied to said coil from said transformers, the secondary winding on one of said transformers being connected in opposition to the secondary winding on the other transformer and having a resistance element connected in shunt therewith having a negative resistance characteristic whereby the voltage of the other transformer increasingly predominates over the voltage of the shunted transformer as the current in said load circuit increases.

15. In combination, an alternating current circuit having a variable current flowing therein, a pair of transformers having their primary windings connected in series with said circuit, one of said transformers being of smaller capacity than the other and being adapted to become saturated in the lower range of current values in said circuit, a secondary circuit including a secondary winding on each of said transformers connected in serial circuit relation, said transformers being connected so that the voltages in said secondary windings are in opposing relation in said secondary circuit, the secondary winding of said smaller transformers having a voltage at current values below the point of saturation not greater than the voltage of the secondary winding of the larger transformer, and a negative resistance element connected in shunt with the secondary winding of the smaller transformer whereby the voltage of the larger transformer increasingly predominates over the voltage of the shunted transformer as the current in the primary circuit increases.

PALMER HUNT CRAIG.